(12) United States Patent
Garcia-Luna-Aceves et al.

(10) Patent No.: US 7,725,596 B2
(45) Date of Patent: May 25, 2010

(54) SYSTEM AND METHOD FOR RESOLVING NETWORK LAYER ANYCAST ADDRESSES TO NETWORK LAYER UNICAST ADDRESSES

(75) Inventors: Jose J. Garcia-Luna-Aceves, San Mateo, CA (US); Bradley R. Smith, Santa Cruz, CA (US)

(73) Assignee: Adara Networks, Inc., San Jose, CA (US)

( * ) Notice: Subject to any disclaimer, the term of this patent is extended or adjusted under 35 U.S.C. 154(b) by 979 days.

(21) Appl. No.: 09/844,759

(22) Filed: Apr. 26, 2001

(65) Prior Publication Data

US 2002/0016860 A1 Feb. 7, 2002

Related U.S. Application Data

(60) Provisional application No. 60/200,404, filed on Apr. 28, 2000, provisional application No. 60/200,401, filed on Apr. 28, 2000, provisional application No. 60/200,511, filed on Apr. 28, 2000, provisional application No. 60/200,402, filed on Apr. 28, 2000, provisional application No. 60/200,403, filed on Apr. 28, 2000.

(51) Int. Cl.
*G06F 15/173* (2006.01)
(52) U.S. Cl. .................. 709/238; 709/203; 709/227; 709/228; 709/229; 709/245; 709/240; 709/242
(58) Field of Classification Search .......... 709/203, 709/227, 228, 229, 238, 240, 242, 245
See application file for complete search history.

(56) References Cited

U.S. PATENT DOCUMENTS 5,088,032 A 2/1992 Bosack

| 5,115,495 A | 5/1992 | Tsuchiya et al. |
| 5,774,660 A | 6/1998 | Brendel et al. |
| 5,774,668 A | 6/1998 | Choquier et al. |
| 5,822,320 A * | 10/1998 | Horikawa et al. ........... 370/396 |

(Continued)

FOREIGN PATENT DOCUMENTS

EP 0817444 1/1998

(Continued)

OTHER PUBLICATIONS

Basturk, Erol, Engel, Robert, Haas, Robert, Peris, Vinod, and Saha, Debanjan. "Using Network Layer Anycast for Load Distribution in the Internet", IBM Research Report, Jul. 29, 1997.*

(Continued)

*Primary Examiner*—Dohm Chankong
(74) *Attorney, Agent, or Firm*—Blakely, Sokoloff, Taylor & Zafman LLP (57) ABSTRACT

An information object repository is configured to resolve a network layer anycast address to a network layer unicast address in response to a request for an information object at the network layer anycast address. The information object repository may be further configured to resolve the network layer anycast address by transmitting a request for the network layer unicast address and awaiting a response thereto, and, in some cases, to return a failure message to a source of the request for the information object if the response to the request for the network layer unicast address is not received within a timeout period. Preferably, the request for the network layer unicast address is a single IP packet that includes the network layer anycast address. Similarly, the request for the network layer unicast address is preferably a single IP packet that includes the network layer unicast address. The response to the request for the network layer unicast address may be returned by a host having the network layer unicast address, or another network node configured to do so.

12 Claims, 5 Drawing Sheets

U.S. PATENT DOCUMENTS

| | | | |
|---|---|---|---|
| 5,859,966 | A | 1/1999 | Hayman et al. |
| 6,003,030 | A | 12/1999 | Kenner et al. |
| 6,012,067 | A | 1/2000 | Sarkar |
| 6,012,068 | A | 1/2000 | Boeseman et al. |
| 6,052,718 | A | 4/2000 | Gifford |
| 6,092,178 | A | 7/2000 | Jindal et al. |
| 6,097,718 | A | 8/2000 | Bion |
| 6,108,703 | A | 8/2000 | Leighton et al. |
| 6,115,752 | A | 9/2000 | Chauhan |
| 6,130,881 | A | 10/2000 | Stiller et al. |
| 6,138,162 | A | 10/2000 | Pistriotto et al. |
| 6,154,777 | A | 11/2000 | Ebrahim |
| 6,175,869 | B1 | 1/2001 | Ahuja et al. |
| 6,182,224 | B1 | 1/2001 | Phillips et al. |
| 6,185,619 | B1 | 2/2001 | Joffe et al. |
| 6,201,794 | B1 | 3/2001 | Stewart et al. |
| 6,205,477 | B1 | 3/2001 | Johnson et al. |
| 6,205,481 | B1 | 3/2001 | Heddaya et al. |
| 6,236,652 | B1 * | 5/2001 | Preston et al. ............... 370/349 |
| 6,249,801 | B1 | 6/2001 | Zisapel et al. |
| 6,256,675 | B1 | 7/2001 | Rabinovich |
| 6,266,706 | B1 | 7/2001 | Brodnik et al. |
| 6,298,381 | B1 | 10/2001 | Shah et al. |
| 6,304,913 | B1 | 10/2001 | Rune |
| 6,314,088 | B1 * | 11/2001 | Yamano ..................... 370/254 |
| 6,314,465 | B1 | 11/2001 | Paul |
| 6,317,778 | B1 | 11/2001 | Dias et al. |
| 6,327,252 | B1 | 12/2001 | Silton et al. |
| 6,377,551 | B1 | 4/2002 | Luo et al. |
| 6,397,246 | B1 | 5/2002 | Wolfe |
| 6,400,681 | B1 | 6/2002 | Bertin et al. |
| 6,405,252 | B1 | 6/2002 | Gupta et al. |
| 6,415,323 | B1 * | 7/2002 | McCanne et al. ........... 709/225 |
| 6,438,652 | B1 | 8/2002 | Jordan et al. |
| 6,449,647 | B1 | 9/2002 | Colby et al. |
| 6,553,376 | B1 | 4/2003 | Lewis et al. |
| 6,574,609 | B1 | 6/2003 | Downs et al. |
| 6,574,663 | B1 | 6/2003 | Bakshi et al. |
| 6,577,609 | B2 | 6/2003 | Sharony |
| 6,578,066 | B1 | 6/2003 | Logan et al. |
| 6,601,098 | B1 | 7/2003 | Case et al. |
| 6,611,872 | B1 * | 8/2003 | McCanne ................... 709/238 |
| 6,687,731 | B1 * | 2/2004 | Kavak ........................ 718/105 |
| 6,708,187 | B1 | 3/2004 | Shanumgam et al. |
| 6,721,291 | B1 * | 4/2004 | Bergenwall et al. ......... 370/331 |
| 6,735,633 | B1 | 5/2004 | Welch |
| 6,741,585 | B1 | 5/2004 | Munoz et al. |
| 6,785,704 | B1 | 8/2004 | McCanne |
| 6,820,132 | B1 | 11/2004 | Puente et al. |
| 6,820,133 | B1 | 11/2004 | Grove et al. |
| 6,917,985 | B2 | 7/2005 | Madruga et al. |
| 7,020,083 | B2 | 3/2006 | Garcia-Luna-Aceves et al. |
| 7,200,111 | B2 | 4/2007 | Garcia-Luna-Aceves et al. |
| 7,343,422 | B2 | 3/2008 | Garcia-Luna-Aceves |
| 7,359,985 | B2 * | 4/2008 | Grove et al. ................ 709/238 |
| 7,392,325 | B2 * | 6/2008 | Grove et al. ................ 709/238 |
| 7,418,518 | B2 * | 8/2008 | Grove et al. ................ 709/238 |
| 2001/0056416 | A1 | 12/2001 | Garcia-Luna-Aceves |
| 2002/0004846 | A1 | 1/2002 | Garcia-Luna-Aceves et al. |
| 2002/0007413 | A1 | 1/2002 | Garcia-Luna-Aceves et al. |
| 2002/0010737 | A1 | 1/2002 | Garcia-Luna-Aceves et al. |
| 2002/0016860 | A1 | 2/2002 | Garcia-Luna-Aceves et al. |
| 2002/0026511 | A1 | 2/2002 | Garcia-Luna-Aceves et al. |
| 2002/0163889 | A1 | 11/2002 | Yemini et al. |
| 2003/0023750 | A1 | 1/2003 | Basturk |
| 2003/0091029 | A1 | 5/2003 | Jo et al. |
| 2003/0101278 | A1 | 5/2003 | Garcia-Luna-Aceves et al. |
| 2003/0200307 | A1 | 10/2003 | Raju et al. |
| 2003/0235155 | A1 | 12/2003 | Boivie et al. |

FOREIGN PATENT DOCUMENTS

| | | |
|---|---|---|
| EP | 0959601 | 11/1999 |
| EP | 0817444 A3 | 12/2000 |
| WO | WO 98/57275 | 12/1998 |
| WO | WO 99/40514 A1 | 8/1999 |
| WO | WO 01/18641 A1 | 3/2001 |

OTHER PUBLICATIONS

Carter et al, "On the network impact of dynamic server selection", 1999, Computer Networks 31, pp. 2529-2558.*

A. Chankunthod, P. Danzig, C. Neerdaels, M. Schwartz, and K. Worrell, "A Hierarchical Internet Object Cache," Proc. USENIX Technical Conference 96, San Diego, California, Jan. 1996.

A. Duda and M.A. Sheldon, "Content Routing in Networks of WAIS Servers," Proc. IEEE 14th International Conference on Distributed Computing Systems, Jun. 1994.

A. Duda and M.A. Sheldon, A. Duda, R. Weiss, J.W. O'Toole, Jr., and D.K. Gifford, "A Content Routing System for Distributed Information Servers," Proc. Fourth International Conference on Extending Database Technology, Mar. 1994.

A. Heddaya and S. Mirad, "WebWave: Globally Load Balanced Fully Distributed Caching of Hot Published Documents," Technical Report BU-CS-96-024, Boston University, Computer Science Department, Oct. 1996.

P. Rodriguez, E.W. Biersack, and K.W. Ross, "Improving The Latency in The Web: Caching or Multicast?," Proc. Third WWW caching workshop, Manchester, UK, Jun. 1998.

D. Karger, E. Lehman, T. Leighton, M. Levine, D. Lewin, and R. Panigraphy, "Consistent Hashing and Random Trees: Distributed Caching Protocols for Relieving Hot Spots on the World Wide Web," Proc. 29th ACM Symposium on Theory of Computing (STOC 97), El Paso, Texas, 1997.

D. Karger, Sherman A. Berkheimer, B. Bogstad, R. Dhanidina, K. Iwamoto, B. Kim, L. Matkins, and Y. Yerushalmi, "Web Caching with Consistent Hashing," Proc. 8th International World Wide Web Conference, Toronto, Canada, May 1999.

D. Small and W.W. Chu, "A Distributed Data Base Architecture for Data Processing in a Dynamic Environment," Proc. COMPCON 79 Spring.

D. Wessels and K. Claffy, Internet Cache Protocol (ICP), Version 2, RFC 2186, Sep. 1997.

D. Wessels, "Squid Internet Object Cache," http://www.squid.org, Aug. 1998.

D.G. Thaler and C.V. Ravishankar, "Using Name Based Mappings to Increase Hit," IEEE/ACM Trans., Networking, 1998.

G. Chiu, C.S. Rahgavendra, and S.M. Ng, "Resource Allocation with Load Balancing Consideration in Distributed Computing Systems," Proc. IEEE INFOCOM 89, Ottawa, Ontario, Canada, Apr. 1989, pp. 758-765.

H.L. Morgan and K.D. Levin, "Optimal Program and Data Location in Computer Networks," Communications of the ACM, vol. 20, No. 5, May 1977.

J.D. Guyon and M.F. Schwartz, "Locating Nearby Copies of Replicated Internet Servers," Technical Report CU-CS-762-95, Department of Computer Science, University of Colorado-Boulder, Feb. 1995.

K.W. Ross, "Hash Routing for Collections of Shared Web Caches," IEEE Network, vol. 1, No. 6, Nov. 1997, pp. 37-44.

L. Zhang, S. Michel, S, Floyd, and V. Jacobson, "Adaptive Web Caching: Towards a New Global Caching Architecture," Proc. Third International WWW Caching Workshop, Manchester, England, Jun. 1998.

B.S. Michel, K. Nikoloudakis, P. Reiher, and L. Zhang, "URL Forwarding and Compression in Adaptive Web Caching," Proc. IEEE Infocom 2000, Tel Aviv, Israel, Apr. 2000.

M.A. Sheldon, A. Duda, R. Weiss, J.W. O'Toole, Jr., and D.K. Gifford, "A Content Routing System for Distributed Information Servers," Proc. Fourth International Confernce on Extending Database Technology, Mar. 1994.

P. Rodriguez and E.W. Briesack, "Continuous Multicast Push of Web Documents over The Internet," IEEE Network Magazine, vol. 12, No. 2, pp. 18-31, 1998.

Proc. ACM SIGCOMM 95 Conference, Cambridge, Massachusetts, Aug. 1995, pp. 288-298.

R. Tewari, M. Dahlin, H.M. Vin and J.S. Kay, "Design Considerations for Distributed Caching on the Internet," Proc. IEEE 19th International Conference on Distributed Computing Systems, May 1999.

S. Mahmoud and J.S. Riordon, "Optimal Allocation of Resources in Distributed Information Networks," ACM Transactions on Data Base Systems, vol. 1, No. 1, Mar. 1976.

T. Berners-Lee, "Information Management: A Proposal," CERN Document, Mar. 1989.

W.W. Chu, "Optimal File Allocation in a Multiple Computer System," IEEE Transactions on Computers, Oct. 1969.

W.W. Chu, "Performance of File Directory Systems for Data Bases in Star and Distributed Networks," Proc. National Computer Conference, 1976, pp. 577-587.

Z. Fei, S. Bhattacharjee, E.W. Zegura, and H.M. Ammar, "A Novel Server Selection Technique for Improving The Response Time of a Replicated Service," Proc. IEEE Infocom 98, Mar. 1998, pp. 783-791.

R. Tewari, "Architectures and Algorithms for Scalable Wide-area Information Systems," Ph.D. Dissertation, Chapter5, Computer Science Department, University of Texas as Austin, Aug. 1998.

http://www.nlar.net/Cache/ICP/draft-vinod-icp-traffic-dist-00.txt, Sep. 10, 2001.

http://wwwcache.ja.net/events/workshop/papers.html, Oct. 3, 2001.

http://www.cs.utexas.edu/users/UTCS/techreports/, Sep. 10, 2001.

Li Fan, Pei Cao, Jussara Almeida, and Andrei Z. Broder, "Summary Cache: A Scalable Wide-Area Web Cache Sharing Protocol," in Proceedings Sigcomm '98. ACM, Oct. 1998.

Tim Berners-Lee, et al., "HTDaemon: TCP/IP based server for Hypertext", source code as of Jul. 8, 1994.

International Search Report-PCT/0113837, Mar. 22, 2002.

J Bound; P Roque: "lPv6 Anycasting Service: Minimum requirements for end nodes", IETF Internet Draft, Online, XP002192644, pp. 1-8.

Bhattacharjee S et al: "Application-layer anycasting", INFOCOM '97. Sixteenth Annual Joint Conference of the IEEE Computer and Communications Societies. Driving the Information Revolution., Proceeding IEEE Kobe, Japan Apr. 7-11, 1997, Los Alamitos, CA USA, IEEE Comput. Soc, US, Apr. 7, 1997, pp. 1388-1396, XP010251961.

Ari Luotonen, Henrik Frystyk Nielsen, and Tim Berbers-Lee. Cern httpd. http://www.w3.org/Daemon, Jul. 1996.

C. Parsa and J.J. Garcia-Luna-Aceves, "Improving TCP Congestion Control over Internets with Heterogeneous Transmission Media," Proc. IEEE ICNP '99, Toronto, Canada (Oct. 31 to Nov. 3, 1999).

Craig Partridge, Trevor Mendez, and Walter Milliken, "Host Anycasting Service," Network Working Group, RFC 1546 (Nov. 1993).

C. Hedrick, "Routing Information Protocol," XP002233127, Network Working Group, Request for Comments: 1058 (Jun. 1998).

Chu et al., "A Case for End System Multicast," Proceedings of ACM SIGMETRICS, Santa Clara, CA, pp. 1-12 (Jun. 2000).

John Jannotti, et al., "Overcast: Reliable Multicasting with an Overlay Network," Proceedings of OSDI, San Diego, CA (Oct. 2000).

J. Garcia-Luna-Aceves and M. Spohn, "Scalable Link-State Internet Routing," ICNP, Sixth International Conference on Network Protocols (ICNP'98), Austin, Texas, pp. 52-61 (Oct. 14-16, 1998).

Bruce Schneier, "Applied Cryptography: Protocols, Algorithms, and Source Code in C," Second Edition, Table of Contents, pp. 30-31, 34-44, 466-474, 483-502, and 10 page errata sheet (1996).

Bradley R. Smith, et al. "Federated Networks Bootstrap Services," University of California Computer Engineering, Santa Cruz, CA 95064, 2 pages (Nov. 8, 1998).

J.J. Garcia-Luna-Aceves and Ewerton L. Madruga, "The Core-Assisted Mesh Protocol," IEEE Journal on Selected Areas in Communications, vol. 17, No. 8, pp. 1380-1394 (Aug. 1999).

Brian Neil Levine and J.J. Garcia-Luna-Aceves, "Improving Internet Multicast with Routing Labels," 10 pages (1997).

A. Heddaya and S. Mirdad, "WebWave: Globally Load Balanced Fully Distributed Caching of Hot Published Documents," Proc. IEEE 17th International Conference on Distributed Computing Systems, Baltimore, Maryland, May 1997.

S. Gadde, M. Rabinovich, and J. Chase, "Reduce, reuse, recycle: An approach to building large Internet caches," in Proc. 6th Workshop Hot Topics in Operating Systems (HotOS-VI), Cape Cod, MA, May 1997, pp. 93-98.

Alex Rousskov and Duane Wessels, "Cache digests," Proceedings 3rd International WWW Caching Workshop, Manchester, England (Apr. 17, 1998).

Renu Tewari, Michael Dahlin, Herrick M. Vin, and Jonathan S. Kay, "Design considerations for distributed caching on the internet," Technical report, Department of Computer Sciences, University of Texas Austin, http://www.cs.utexas.edu/users /UTCS/techreports/ (Oct. 1998).

Paul Mockapetris, "Domain System Changes and Observations," Network Working Group, RFC 973 (Jan. 1986).

Chu et al., "A Case for End System Multicast," Proceedings of ACM SIGMETRICS, Santa Clara, CA, pp. 1-12 (Jun. 2000).

Sandra G. Dykes, et al., "An Empirical Evaluation of Client-side Server Selection Algorithms," IEEE Infocom, vol. 3, pp. 1361-1370 (Mar. 2000).

"Cisco Distributed Director", http://wwwtlc.iet.unipi.it/VoiceIP/cisco/114.pdf, (Oct. 1998).

Jueneman, Robert R., "Novell Certificate Extension Attributes", *Tutorial and Detailed Design*, (Aug. 7, 1998),Version 0.998.

Maclarty, G. , et al., "Policy-based content delivery: an active network approach", *Computer Communications 24 (2001)*, *University of Technology, Sydney, Faculty of Information Technology, Australia*, Elsevier Science B.V 2001,(2001),241-248.

Levine, Brian Neil, et al., "New Routing Services for Internet Multicast," Computer Engineering Department School of Engineering, University of California, Santa Cruz, CA 95064, USA, Apr. 30, 1998, 1-17 pages.

Guyton, J.D., et al., "Locating Nearby Copies of Replicated Internet Servers" Technical Report CU-CS-762-95, Dept. of Computer Science, University of Colorado-Boulder, Feb. 1995.

Kent, Stephen and Randall Atkinson, "Security Architecture for the Internet Protocol," RFC 2401 (Nov. 1998), 66 pages.

Mochapetris, P., "Domain Names—Concepts and Facilities," RFC 1034 (Nov. 1987), 55 pages.

Mochapetris, P., "Domain Names—Implementation and Specification," RFC 1035 (Nov. 1987), 45 pages.

Obraczka, K., et al., "A Tool for Massively Replicating Internet Archives: Design, Implementation, and Experience," Proceeding of the 16th International Conference on Distributed Computing Systems, Hong Kong, (May 27-30, 1996), 8 pages.

Oguchi, Masato, et al., "A Proposal for a World-Wide Web Caching Proxy Mechanism" XP000754599, Global Information Infrastructure (GII) Evolution: Interworking Issues, Interworking '96, Third International Symposium on Interworking, Nara Japan, Oct. 1-3, 1996, p. 531-540. Oct. 1, 1996.

PCT Notification of Transmittal of the International Search Report or the Declaration for PCT Counterpart Application No. PCT/US01/13834, 6 pages, Mar. 18, 2002.

PCT Notification of Transmittal of the International Search Report or the Declaration for PCT Counterpart Application No. PCT/US01/13833, Apr. 11, 2002.

Rekhter, Y., et al., "A Border Gateway Protocol 4 (BGP-4)" Network Working Group, Request for Comments, 1771, 57 pages. Mar. 1995.

Touch, Joe "Dynamic Internet Overlay Deployment and Management Using the X-Bone" Proceedings of IEEE ICNP, Osaka Japan pp. 59-68 (2000).

University of Manchester 3rd International WWW Caching Workshop, Jun. 15-17, 1998, Submitted Papers Section. List of papers submitted so far for the workshop. 6 pages, downloaded Oct. 3, 2001 from http://wwwcache.ja.net/events/workshop/papers.html.

Valloppillil, V., et al., "Hierarchical HTTP Routing Protocol", Internet Draft, http://www.nlanr.net/Cache/ICP/draft-vinod-icp-traffic-dist-00.txt Apr. 21, 1997.

W. Simpson, "IP in IP Tunneling," RFC 1853, 8 pages, Oct. 1995.

* cited by examiner

SYSTEM AND METHOD FOR RESOLVING NETWORK LAYER ANYCAST ADDRESSES TO NETWORK LAYER UNICAST ADDRESSES

RELATED APPLICATIONS

The present application is related to and hereby claims the priority benefit of the following co-pending applications, each of which is incorporated by reference herein:
- (a) U.S. Provisional Patent Application No. 60/200,404, entitled "System and Method for Using a Mapping Between Client Addresses and Addresses of Caches to Support Content Delivery", filed Apr. 28, 2000.
- (b) U.S. Provisional Patent Application No. 60/200,401, entitled "System and Method for Discovering Optimum Information Object Repositories in Computer Networks (WILD Protocol)", filed Apr. 28, 2000.
- (c) U.S. Provisional Patent Application No. 60/200,511, entitled "System and Method for Using URLs to Map Application Layer Content Names to Network Layer Anycast Addresses", filed Apr. 28, 2000.
- (d) U.S. Provisional Patent Application No. 60/200,402, entitled "System and Method for Using Network Layer URL Routing to Locate the Closest Server Carrying Specific Content (NURL Routing)", filed Apr. 28, 2000.
- (e) U.S. Provisional Application No. 60/200,403, entitled "System and Method for Resolving Network Layer Anycast Addresses to Network Layer Unicast Addresses (AARP)", filed Apr. 28, 2000.

This application is also related to U.S. patent application Ser. No. 09/810,148, entitled "System and Method for Discovering Information Objects and Information Object Repositories in Computer Networks", filed Mar. 15, 2001, now U.S. Pat. No. 7,162,539 B2, issued Jan. 9, 2007.

FIELD OF THE INVENTION

The present invention relates to a system and method for the discovery of information objects and servers storing information objects distributed over computer networks. More particularly, the present invention provides a system and method for resolving network layer anycast addresses to network layer unicast addresses.

BACKGROUND

An internetwork is a collection of computer networks interconnected by nodes, each such node may be a general-purpose computer or a specialized device, such as a router. As such, an internetwork is often called a network of networks. The purpose of building an internetwork is to provide information services to end nodes; each end node may be a general-purpose computer or a specialized device, such as a camera or a display. The Internet is an internetwork in which information is organized into packets to be distributed on a store-and forward manner from source to destination end nodes, and in which routers and end nodes use the Internet Protocol (IP) to communicate such packets.

The World Wide Web (also known as WWW or Web) has become an essential information service in the Internet. The Web constitutes a system for accessing linked information objects stored in end nodes (host computers) all over the Internet. Berners-Lee wrote the original proposal for a Web of linked information objects (T. Berners-Lee, "Information Management: A Proposal," CERN Document, March 1989). The Web consists of a vast collection of information objects organized as pages, and each page may contain links to other pages or, more generally, information objects with which content is rendered as audio, video, images, text or data. Pages are viewed by an end user with a program called a browser (e.g., Netscape Navigator). The Web browser runs in an end system at the user premises. The client (Web browser) obtains the required information objects from a server (Web server) using a request-response dialogue as part of the Hypertext Transfer Protocol (HTTP). Information objects are identified by means of names that are unique throughout the Internet; these names are called Uniform Resource Locators or URLs. A URL consists of three components: the protocol or scheme to be used for accessing the object (e.g., http), the name (a DNS name) of the host on which the object is located, and a local identifier that is unique in the specified host.

Like any large-scale system, the Web requires the use of mechanisms for scaling and reliability. More specifically, as the number of information objects that can be obtained through the Web increases, people find it more difficult to locate the specific information objects they need. Furthermore, as the number of Web users and servers increase, the sites or servers that store the requested information objects may be very far from the users requesting the objects, which leads to long latencies in the access and delivery of information, or the servers storing the information objects may be overwhelmed with the number of requests for popular information objects.

It was clear soon after the birth of the Web that the simple client-server architecture underlying the Web protocols would not scale to the number of clients and servers and volume of traffic the popularity of the Web would be demanding very soon. To address this impending crisis research efforts were started, that continue today, to develop solutions to this scaling problem based on the cache model used in other areas of computer science. In general, the results of these efforts have taken the form of caching proxy servers that intercept Web requests destined for Web servers in the Internet, and attempt to service these requests from a cache of objects retrieved for previous requests. In the event of a cache miss the origin server is contacted, the content loaded to the cache, and the client's request is then satisfied. As with all cache-based systems the goal of these solutions is to replace many expensive, slow data fetches with one expensive, slow fetch and many fast, cheap ones. As will be reviewed below, this effort, while regularly facing new challenges and dilemmas, has generally made steady progress towards providing a solution to the problem of the access and delivery of Web content that can scale to the global reach now envisioned for the Web.

To enable the Web to scale to support large and rapidly increasing numbers of users and a vast and growing collection of information objects, the information objects in the Web must be stored distributedly at multiple servers, in a way that users can retrieve the information objects they need quickly and without overwhelming any one of the servers storing the objects. Accordingly, distributing information objects among multiple sites is necessary for the Web to scale and be reliable. The schemes used to accomplish this are called Web caching schemes. In a Web caching scheme, one or multiple Web caches or proxy Web servers (information object repositories, which term can also encompass origin content servers) are used in computer networks and the Internet to permit multiple host computers (clients) to access a set of information objects from sites other than the sites from which the content (information objects or just objects) are provided originally. Web caching schemes support discovering the sites where information objects are stored, distributing information objects among the Web caches, and retrieving information objects from a given Web cache. The many proposals and implementations to date differ on the specific mechanisms used to support each of these services.

Reflecting the growing importance of the Web as an infrastructure technology, a Web caching industry has appeared and prospered in recent years. Initially the products of this industry were caching proxy servers for use by organizations connected to the Internet that wanted to both reduce the utilization of their expensive ISP services, and to improve the Web browsing experiences of their users. More recently, however, a new segment of this industry has evolved that serves the needs of the Web server providers. These services, typically called Web content delivery services, involve the hosting of Web content for a fee. These services allow Web server providers to deploy content whose popularity attracts larger audiences than can be supported by their existing Web server infrastructure without having to perform the expensive upgrades to their server and network infrastructure that would otherwise be required. This has proven to be a lucrative segment of the Web caching industry and has changed a number of fundamental assumptions made by previous research in developing Web caching solutions.

The traditional approach to Web caching, called client-directed Web caching here, has made the fundamental assumption that Web caching was done by, and for the benefit of Web users. As a result, the designs of Web caching solutions developed to date have been based on a number of concrete assumptions, such as the following:

(1) the cache server used by a client is configured statically or quasi-statically;

(2) the caching infrastructure is owned and deployed by many organizations and therefore must inter-operate over the open Internet; and (3) the number of URLs served is unknown.

In contrast, the assumptions that can be made by these new Web caching services, called server-directed Web caching here, are significantly less restrictive, such as the following:

(1) the cache used by a client is determined dynamically;

(2) the caching infrastructure is owned and deployed by one entity, and can have non-standard components; and (3) the number of URLs served is known.

It seems clear that these new assumptions provide significant new latitude in the design of a Web caching service that may allow for significantly more efficient solutions than those developed based on the more restrictive assumptions underlying the previous client-directed solutions.

Web caching proxies intercept Web requests destined for Web servers in the Internet (thus the name "proxy"), and attempt to service these requests from a cache of objects retrieved for previous requests (thus the name "caching"). In the event of a cache miss the origin server is contacted, the content loaded to the cache, and the client's request is then satisfied. These early efforts involved stand-alone caches (Ari Luotonen, Henrik Frystyk Nielsen, and Tim Berbers-Lee. Cern httpd. http://www/w3/org/Daemon, July 1996), whose only source of content on a cache miss was the original content server. While somewhat effective at lightening the load on Web servers and the network infrastructure, it quickly became clear that standalone caches presented a new dilemma: while the hit rate experienced by a cache improves as the number of clients using the cache grows, so does the cache server's load. The effectiveness of web caches at reducing server and network load was limited by the compute and I/O power of the cache servers. While the power of these servers was growing, it was not growing as fast as the volume of Web traffic. Therefore it was clear that, while standalone Web caches might delay the day of reckoning, they would not be able to eliminate it.

On realizing this in the 1995-96 time-frame, researchers began working on solutions to allow multiple Web caches to cooperate in servicing a larger set of clients. It was hoped that the ability to support a large and scalable set of clients would provide a long-term solution to Web server and network overload.

Many methods exist in the prior art for determining the server, cache, mirror server, or proxy from which information objects should be retrieved. The prior art dates to the development of the ARPANET in the 1970s and the study and implementation of methods to solve the file allocation problem (FAP) for databases distributed over the ARPANET and computer networks in general.

File allocation methods for distributed databases (e.g., W. W. Chu, "Optimal File Allocation in a Multiple Computer System," IEEE Transactions on Computers, October 1969; S. Mahmoud and J. S. Riordon, "Optimal Allocation of Resources in Distributed Information Networks," ACM Transactions on Data Base Systems, Vol. 1, No. 1, March 1976; H. L. Morgan and K. D. Levin, "Optimal Program and Data Locations in Computer Networks," Communications of the ACM, Vol. 20, No. 5, May 1977) and directory systems (e.g., W. W. Chu, "Performance of File Directory Systems for Data Bases in Star and Distributed Networks," Proc. National Computer Conference, 1976, pp. 577-587; D. Small and W. W. Chu, "A Distributed Data Base Architecture for Data Processing in a Dynamic Environment," Proc. COMPCON 79 Spring) constitute some of the earliest embodiments of methods used to select a delivery site for accessing a file or information object that can be replicated at a number of sites.

Another example of this prior art is the method described by Chiu, Raghavendra and Ng (G. Chiu, C. S. Rahgavendra, and S. M. Ng, "Resource Allocation with Load Balancing Consideration in Distributed Computing Systems," Proc. IEEE INFOCOM 89, Ottawa, Ontario, Canada, April 1989, pp. 758-765). According to this method, several identical copies of the same resource (e.g., a file, an information object) are allocated over a number of processing sites (e.g., a mirror server, a cache) of a distributed computing system. The method attempts to minimize the cost incurred in replicating the resource at the processing sites and retrieving the resource by users of the system from the processing sites.

Several different approaches exist in the prior art for discovering information objects in Web caching schemes. Recent work has addressed the same resource allocation and discovery problems within the context of Internet services. Guyton and Schwartz (J. D. Guyton and M. F. Schwartz, "Locating Nearby Copies of Replicated Internet Servers," Technical Report CU-CS-762-95, Department of Computer Science, University of Colorado-Boulder, February 1995; Proc. ACM SIGCOMM 95 Conference, Cambridge, Mass., August 1995, pp. 288-298) describe and analyze server location techniques for replicated Internet services, such as Network Time Protocol (NTP) servers and Web caches. Guyton and Schwartz propose gathering location data with router support in two ways. In one method, routers advertise the existence or absence of replicated servers as part of their normal routing exchanges involving network topological information. Routers examine a distance metric for the advertised servers in a way that each router retains knowledge of at least the nearest servers. In this way, each router in an internetwork has enough knowledge to direct client requests to the nearest servers, without necessarily having to maintain knowledge of all the servers in the internetwork. In another method, servers poll routers for the content of their routing tables. Guyton and Schwartz also describe a method for gathering location data using routing probes without router support by means of measurement servers. According to this method, measurement servers explore the routes to the replicated servers providing services and content to clients. When a client asks a measurement server for a list of nearby servers from which to request a service, the measurement server takes into account the route back to the client in deciding the list of servers that appear closer to the client.

One approach to object discovery consists in organizing Web caches hierarchically. In a hierarchical Web cache architecture, a parent-child relationship is established among caches; each cache in the hierarchy is shared by a group of clients or a set of children caches. A request for an information object from a client is processed at a lowest-level cache, which either has a copy of the requested object, or asks each of its siblings in the hierarchy for the object and forwards the request to its parent cache if no sibling has a copy of the object. The process continues up the hierarchy, until a copy of the object is located at a cache or the root of the hierarchy is reached, which consists of the servers with the original copy of the object.

One of the earliest examples of hierarchical Web caching was the Discover system (A. Duda and M. A. Sheldon, "Content Routing in Networks of WAIS Servers," Proc. IEEE 14th International Conference on Distributed Computing Systems," June 1994; M. A. Sheldon, A. Duda, R. Weiss, J. W. O'Toole, Jr., and D. K. Gifford, "A Content Routing System for Distributed Information Servers," Proc. Fourth International Conference on Extending Database Technology, March 1994), which provides associative access to servers; the user guides the refinement of requests.

Harvest (A. Chankhunthod, P. Danzing, C. Neerdaels, M. Schwartz, and K. Worrell, "A Hierarchical Internet Object Cache," Proc. USENIX Technical Conference 96, San Diego, Calif., January 1996) and Squid (D. Wessels, "Squid Internet Object Cache," http://www.squid.org, August 1998) are two of the best known hierarchical Web cache architectures. Harvest and Squid configure Web caches into a static hierarchical structure in which a Web cache has a static set of siblings and a parent. The Internet Caching Protocol or ICP (D. Wessels and K. Claffy, "Internet Cache Protocol (ICP), Version 2," RFC 2186, September 1997) is used among Web caches to request information objects.

In the Harvest hierarchies, siblings and parents are configured manually in Web caches or proxies; this is very limiting and error prone, because reconfiguration must occur when a cache enters or leaves the system. A more general limitation of hierarchical Web caching based on static hierarchies is that the delays incurred in routing requests for information objects can become excessive in a large-scale system, and the latency of retrieving the information object from the cache with a copy of the object can be long, because there is no correlation between the routing of the request to a given cache in the hierarchy and the network delay from that cache to the requesting client. Furthermore, some Web caches may be overloaded with requests while others may be underutilized, even if they store the same objects.

In the WebWave protocol (A. Heddaya and S. Mirdad, "WebWave: Globally Load Balanced Fully Distributed Caching of Hot Published Documents," Technical Report BU-CS-96-024, Boston University, Computer Science Department, October 1996; A. Heddaya and S. Mirdad, "WebWave: Globally Load Balanced Fully Distributed Caching of Hot Published Documents," Proc. IEEE 17th International Conference on Distributed Computing Systems, Baltimore, Md., May 1997) Web caches are organized as a tree rooted at the server that provides the original copy of one object or a family of information objects; the leaves of the tree are the clients requesting the information objects, and the rest of the nodes in the tree are Web caches. The objective of the protocol is to achieve load balancing among Web caches; each Web cache in such a tree maintains a measurement of the load at its parent and children in the tree, and services or forwards the request to its parent automatically based on the load information. This approach reduces the possibility of overloading Web caches as in the Harvest approach to hierarchical Web caching; however, delays are still incurred in the propagation of Requests from heavily loaded Web caches to their ancestors in the Web hierarchy.

Hash routing protocols (K. W. Ross, "Hash Routing for Collections of Shared Web Caches," IEEE Network, Vol. 11, No. 6, November 1997, pp 37-44) constitute another approach to support object discovery in shared caches. Hash routing protocols are based on a deterministic hashing approach for mapping an information object to a unique cache (D. G. Thaler and C. V. Ravishankar, "Using Name-Based Mappings To Increase Hit," IEEE/ACM Trans. Networking, 1998; V. Valloppillil and J. Cohen, "Hierarchical HTTP Routing Protocol," Internet Draft, http://www.nlanr.net/Cache/ICP/draft-vinod-icp-traffic-dist-00.txt) to distribute the information objects (universal resource locator or URL in the case of the Web) among a number of caches; the end result is the creation of a single logical cache distributed over many physical caches. An important characteristics of this scheme is that information objects are not replicated among the cache sites. The hash function can be stored at the clients or the cache sites. The hash space is partitioned among the N cache sites, when a client requires access to an information object o, the value of the hash function for o, h(o), is calculated at the client or at a cache site (in the latter case the cache would be configured at the client, for example). The value of h(o) is the address of the cache site to contact in order to access the information object o.

The Cache Resolver is another recent approach to hierarchical Web caching (D. Karger, E. Lehman, T. Leighton, M. Levine, D. Lewin, and R. Panigrahy, "Consistent Hashing and Random Trees: Distributed Caching Protocols for Relieving Hot Spots on the World Wide Web," Proc. 29th ACM Symposium on Theory of Computing (STOC 97), El Paso, Tex., 1997; D. Karger, Sherman, A. Berkheimer, B. Bogstad, R. Dhanidina, K. Iwamoto, B. Kim, L. Matkins, and Y. Yerushalmi, "Web Caching with Consistent Hashing," Proc. 8th International World Wide Web Conference, Toronto, Canada, May 1999). This approach combines hierarchical Web caching with hashing and consists of two main tools, random cache trees and consistent hashing. A tree of Web caches is defined for each information object. When a browser (client) requires an information object, it picks a leaf of the tree and submits a request containing its identifier, the identifier of the object, the sequence of caches through which the request is to be routed if needed. A Web cache receiving a request it determines if it has a local copy of the page and responds to the request if it does; otherwise, it forwards the request to the next Web cache in the path included in the request. A Web cache starts maintaining a local copy of an information object when the number of requests it receives for the object reaches a predefined number. A client selects a Web cache by means of consistent hashing, which disseminates requests to leaves of the Web caching hierarchy evenly but, unlike traditional hashing techniques, need not redistribute an updated hash table every time a change occurs in the caching hierarchy (e.g., a new Web cache joins or a Web cache fails). Because caching is difficult to implement or add to existing Web browsers, the Cache Resolver approach implements the hashing in DNS (Internet Domain Name Service) servers modified to fit this purpose. The remaining limitations with this approach stem from the continuing use of a hierarchy of Web caches and the need to implement a hashing function in either Web clients or DNS servers. Routing a request through multiple Web Caches can incur substantial delays for clients to retrieve information objects that are not popular among other clients assigned to the same Web cache by the hashing function. Additional delays, even if small, are incurred at the DNS server that has to provide the address of the Web cache that the client should access. Furthermore, the DNS servers supporting the consistent hashing function must receive information about the loading of all the Web caches in the entire system, or at least a region of the system, in order to make accurate load-balancing decisions.

This DNS-based approach, without the use of hierarchies of Web caches, is advocated in the Akamai CDN solution (F. T. Leighton and D. M. Lewin, "Global Hosting System," U.S. Pat. No. 6,108,703, Aug. 22, 2000). The "global hosting system" advocated by Akamai of Cambridge, Mass. assumes that a content provider services an HTML document in which special URLs specifying a domain name specific to Akamai. When the client needs to obtain the IP address of the Web cache hosting the content specified in the special URL, the client first contacts its local DNS. The local DNS is pointed to a "top-level" DNS server that points the local DNS to a regional DNS server that appears close to the local DNS. The regional DNS server uses a hashing function to resolve the domain name in the special URL into the address of a Web cache (hosting server) in its region, which is referred to as the target Web cache in the present application, in a way that the load among Web caches in the region is balanced. The local DNS passes the address of that Web cache to the client, which in turn sends its request for the information object to that Web cache. If the object resides in the target Web cache, the cache sends the object to the client; otherwise, the object is retrieved from the original content site.

The global hosting system advocated by Akamai was intended to address problems associated with traditional load-balanced mirroring solutions in which a load balancer or a hierarchy of load balancers redirect requests to one of a few hosting sites to balance the load among such sites. Companies such as Cisco Systems of Santa Clara, Calif., F5 Networks, Inc. of Seattle, Wash., Resonate, Inc. of Sunnyvale, Calif., Nortel Networks of Brampton, Ontario, and Foundry Networks, Inc. of San Jose, Calif. currently provide examples of load-balanced solutions. The limitations of the global hosting system are inherent to the fact that the approach is, in essence, a DNS-based load-balanced mirroring solution. The global hosting system selects a target Web cache based entirely on the region that appears to favor the local DNS, which need not favor the client itself, and balances the load among Web caches without taking into account the latency between the Web caches and the clients. In the case of a cache miss, the information object has to be retrieved from the original content site, which means that latencies in the delivery of content can vary widely, unless the content is mirrored in all the caches of all regions.

In summary, while these hierarchies and hash-based solutions provide a significant improvement in effectiveness over their stand-alone predecessors, they give rise to the following new dilemma: while increasing cache hit rates, and, thereby increasing the server and network load, these solutions tend to increase the request latency seen by a Web client. Hierarchies increase the average number cache hops needed to reach an object, while hashing is insensitive to the distance between a client and the cache site it selects, which also increases the average number of hops needed to reach an object.

Another alternative approach to hierarchical web caching and hash routing protocols consists of forwarding client requests for URLs using routing tables that are very similar to the routing tables used today for the routing of IP packets in the Internet (L. Zhang, S. Michel, S. Floyd, and V. Jacobson, "Adaptive Web Caching: Towards a New Global Caching Architecture," Proc. Third International WWW Caching Workshop, Manchester, England, June 1998, B. S. Michel, K. Nikoloudakis, P. Reiher, and L. Zhang, "URL Forwarding and Compression in Adaptive Web Caching," Proc. IEEE Infocom 2000, Tel Aviv, Israel, April 2000). According to this approach, which is referred to as "URL request forwarding" herein, Web caches maintain a "URL request routing table" and use it to decide how to forward URL requests to another Web caches when requested information objects are not found locally. The keys of the URL request routing tables are URL prefixes, which are associated with one ore more identifiers to the next-hop Web caches or cache groups, and a metric reflecting the average delay to retrieve a request from a matching URL.

In this approach, an entry in the URL request routing table specifies a URL prefix and the next-hop Web cache towards an area or neighborhood of Web caches where the object resides. Ideally, a Web cache needs to know where a copy of a given object resides; however, because of the large number of objects (identified by URLs) that can be requested in a system, the URL request forwarding approach requires Web caches to be organized into areas or neighborhoods. All Web caches within the same area know the objects available in every other Web cache in the same area. In addition, for those objects that are not found in the area of a Web cache, the Web cache also maintains the next-hop Web cache towards the area in which a Web cache with the content resides.

Unfortunately, this approach has several scaling and performance limitations. First, requiring each Web cache to know all the Web caches where each object in the area resides incurs a large overhead, which is akin to the overhead of a traditional topology-broadcast protocol for IP routing, with the added disadvantage that the number of objects that can reside in an area can be much larger than the number of IP address ranges maintained in backbone routers of the Internet. Second, because Web caches only know about the next hop towards a URL that does not reside in a region, a request for an object that lies outside the area of a Web cache may traverse multiple Web-cache hops before reaching a Web cache in the area where an object is stored. This introduces additional latencies akin to those incurred in the caching hierarchies proposed in other schemes discussed above. Third, it is difficult to modify Web caches in practice to implement the mechanisms needed for the forwarding of URL requests.

To reduce the delays incurred in hierarchical Web caches, Tewari, Dahlin, Vin and Kay (R. Tewari, "Architectures and Algorithms for Scalable Wide-area Information Systems," Ph.D. Dissertation, Chapter 5, Computer Science Department, University of Texas at Austin, August 1998; R. Tewari, M. Dahlin, H. M. Vin, and J. S. Kay, "Design Considerations for Distributed Caching on the Internet," Proc. IEEE 19th International Conference on Distributed Computing Systems, May 1999) introduce hint caches within the context of a hierarchical Web caching architecture. According to this scheme, a Web cache maintains or has access to a local hint cache that maintains a mapping of an object to the identifier of another Web cache that has a copy of the object and is closest to the local hint cache. Web caches at the first level of the hierarchy maintain copies of information objects, while Web caches at higher levels only maintain hints to the objects. Hints are propagated along the hierarchy topology from the Web caches lower in the hierarchy to Web caches higher in the hierarchy. Furthermore, a Web cache with a copy of an object does not propagate a hint for the object. The limitation with this approach is that a Web caching hierarchy must still be established, which needs to be done manually in the absence of an automated method to establish the hierarchy, and the Web caching hierarchy must match the locality of reference by clients to reduce control overhead.

Another approach to reducing the latencies incurred with cache hierarchies consists of replacing the cache hierarchy with a directory (centralized or hierarchical) containing information about the objects kept at every cache. (Li Fan, Pei Cao, Jussara Almeida, and Andrei Z. Broder, "Summary cache: A scalable wide-area web cache sharing protocol," in Proceedings Sigcomm '98. ACM, October 1998. http://www.cs.wisc.edu/cao/papers/summarycache.html; Syam Gadde, Michael Rabinovich, and Jeff Chase, "Reduce, reuse, recycle: An approach to building large internet caches," in Proceedings 6th Workshop on Hot Topics in Operating Systems, May 1997, Alex Rousskov and Duane Wessels, "Cache digests," in Proceedings 3rd International WWW Caching Workshop, June 1998, http://wwwcacheja.net/events/workshop/papers.html., Renu Tewari, Michael Dahlin, Harrick M. Vin, and Jonathan S. Kay, "Design considerations for distributed caching on the internet," Technical report, Department of Computer Sciences, University of Texas Austin, October 1998, http://www.cs.utexas.edu/users/UTCS/techreports/.) This directory is then used by a cache on a miss to determine the closest cache site holding the desired content. The limitations of this directory-based approach is that the directory site(s) must receive information about all caches in the system.

A number of proposals exist to expedite the dissemination of information objects using what is called "push distribution" and exemplified by Backweb, Marimba and Pointcast ("BackWeb: http://www.backweb.com/"; "Marimba: http://www.marimba.com/"; "Pointcast: http://www.pointcast.com/"). According to this approach, a Web server pushes the most recent version of a document or information object to a group of subscribers. The popular Internet browsers, Netscape and Internet Explorer, use a unicast approach in which the client receives the requested object directly from the originating source or a cache. As the number of subscribers of a document or information object increases, the unicast approach becomes inefficient because of processing overhead at servers and proxies and traffic overhead in the network. The obvious approach to make push distribution scale with the number of subscribers consists of using multicast technology. According to this approach (P. Rodriguez and E. W. Briesack, "Continuous Multicast Push of Web Documents over The Internet," IEEE Network Magazine, Vol. 12, No. 2, pp. 18-31, 1998), a document is multicasted continuously and reliably within a multicast group. A multicast group is defined for a given Web document and subscribers join the multicast group of the Web document they need to start receiving the updates to the document. A multicast group consist of the set of group members that should receive information sent to the group by one or multiple sources of the multicast group. The main shortcoming of this particular approach to push distribution are the following:

(1) the portion of the Internet where subscribers are must support multicast routing distribution; and (2) a multicast address and group must be used for each Web document that is to be pushed to subscribers, which becomes difficult to manage as the number of documents to be pushed increases.

Furthermore, Rodriguez, Biersack, and Ross (P. Rodriguez, E. W. Biersack, and K. W. Ross, "Improving the WWW: Caching or Multicast?," Institut EURECOM 2229, Route Computer Networks and ISDN Systems, pp. 1-17 (Mar. 30, 1998) have shown that multicasting Web documents is an attractive alternative to hierarchical Web caching only when the documents to be pushed are very popular, caching distribution incurs less latency.

Kenner and Karush (B. Kenner and A. Karush, "System and Method for Optimized Storage and Retrieval of Data on a Distributed Computer Network," U.S. Pat. No. 6,003,030, Dec. 14, 1999) propose a method for expediting the delivery of information objects to end users. In this method, the end user site is equipped with special software in addition to the Web browser. This software consists of a configuration utility and a client program. The configuration utility is used to download a delivery site file specifying a list of the delivery sites (Web caches or originating Web servers) from which the information objects can be retrieved and a suite of tests that can be run to determine which delivery site to contact. The limitations with this approach stem from the fact that it is not transparent to end user sites. In particular, the end user site needs to run additional software; performance tests must be conducted from the end-user site to one or more delivery sites to decide which site to use; and when changes occur to the delivery sites, a new version of the delivery site file must be retrieved by the end-user site, or new performance tests must be conducted.

Another approach to helping select servers in a computer network (Z. Fei, S. Bhattacharjee, E. W. Zegura, and M. H. Ammar, "A Novel Server Selection Technique for Improving The Response Time of a Replicated Service," Proc. IEEE Infocom 98, March 1998, pp. 783-791) consists of broadcasting server loading information after a certain load threshold or time period is exceeded. The limitation of this approach is that, just as with topology-broadcast protocols used for routing in computer networks, the scheme incurs substantial overhead as the number of servers increases.

Another recent approach to directing clients to hosting sites with requested information objects or services is the replica routing approach proposed by Sightpath, Inc. (D. K. Gifford, "Replica Routing," U.S. Pat. No. 6,052,718, Apr. 18, 2000). According to the Replica Routing approach, an information object or service is replicated in a number of replica servers. The replica routing system redirects a client requesting the information object or service to a "nearby" replica of the object or service. In one approach, all replica routers know the replica advertisements from each of the replica servers in the system, which summarize information about their location and observations about the local internetwork topology and performance. Using this flooding of advertisements, a replica router discerns which replica server appears nearby any one client. However, requiring each replica router to receive the advertisements from every other replica server becomes impractical as the number of replica servers and replica routers increases.

To remedy this problem, replica routers are organized into a hierarchy, and replica advertisements are propagated only part way up such router hierarchy. A client request is routed to the root of the hierarchy and from there is forwarded down the hierarchy, until it reaches a replica router with enough knowledge about the replica's internetwork location to make an informed redirection decision. This approach has similar performance and scaling limitations as the prior approaches summarized above based on hierarchies of Web caches, flooding of information among caches or servers, and forwarding of requests over multiple hops.

Another recent approach to directing clients to hosting sites with requested information objects or services is the enhanced network services method by Phillips, Li, and Katz (S. G. Phillips, A. J. Li, and D. M. Katz, "Enhanced Network Services Using a Subnetwork of Communicating Processors," U.S. Pat. No. 6,182,224, Jan. 30, 2001.). Insofar as directing clients to servers, the enhanced network services method is very similar to the gathering of location data with router support advocated by Guyton and Schwartz described previously. As in the Guyton and Schwartz's approach, routers using the enhanced network services approach gather network topological data and also include as part of their normal routing exchanges information about the hosts that can provide content and services to clients; routers can then rank the hosts according to their relative distance in the network. In addition to data regarding hosts that can provide services, routers in the enhanced network services approach can include in their normal routing exchanges host information regarding logged-in users and willingness to pay for performing a designated service. In contrast to the proposal by Guyton and Schwartz, the enhanced network services approach does not attempt to limit the amount of network topological information that routers need to exchange in order to direct clients to best qualified servers. This approach has, therefore, similar performance and scaling limitations as the prior approaches summarized above based on flooding of information among caches or servers, and forwarding of requests over multiple hops.

SUMMARY OF THE INVENTION

In one embodiment, a request for an information object at an anycast network address is received; and the request is resolved to a corresponding unicast address for the information object. The unicast address for the information object may then be returned to the requester. The request is sometimes received at an information object repository selected without regard as to whether the information object is actually stored at the information object repository, but rather according to specified performance metrics, such as: average delay from the selected information object repository to a source of the request, average processing delay at the selected information object repository, reliability of a path from the selected information object repository, available bandwidth in said path, and loads on the selected information object repository. The selected information object repository may also be instructed to obtain a copy of the information object.

In a further embodiment, an information object repository is configured to resolve a network layer anycast address to a network layer unicast address in response to a request for an information object at the network layer anycast address. The information object repository may be further configured to resolve the network layer anycast address by transmitting a request for the network layer unicast address and awaiting a response thereto, and, in some cases, to return a failure message to a source of the request for the information object if the response to the request for the network layer unicast address is not received within a timeout period.

Yet another embodiment provides a network that includes at lest one client configured to transmit a request for an information object using a network layer anycast address; and an information object repository configured to receive the request for the information object and to resolve the network layer anycast address into a network layer unicast address. The information object repository may be further configured to resolve the network layer anycast address by transmitting a request for the network layer unicast address and awaiting a response thereto. If the response to the request for the network layer unicast address is not received within a timeout period, a failure message may be returned to the client.

Preferably, the request for the network layer unicast address is a single IP packet that includes the network layer anycast address. Similarly, the request for the network layer unicast address is preferably a single IP packet that includes the network layer unicast address. The response to the request for the network layer unicast address may be returned by a host having the network layer unicast address, or another network node configured to do so.

BRIEF DESCRIPTION OF THE DRAWINGS

The present invention is illustrated by way of example, and not limitation, in the figures of the accompanying drawings in which.

DETAILED DESCRIPTION

Various methods and systems for resolving network layer anycast addresses to network layer unicast addresses are disclosed herein. Such methods and systems may find application in networks configured to control access to information objects (i.e., content) carried in information object repositories (i.e., caches, proxies, origin content servers and the like) and/or to support delivery of such information objects. The information objects and/or information object repositories storing the information objects may be distributed over one or more computer networks or networks of networks. In the following description, numerous specific details are set forth in order to provide a thorough understanding of the present invention. However, it will be evident to those of ordinary skill in the art that some of these specific details need not be used to practice the present invention and/or that equivalents thereof may be used. In other cases, well-known structures and components have not been shown in detail to avoid unnecessarily obscuring the present invention. Thus, although discussed with reference to certain illustrated embodiments, upon review of this specification, those of ordinary skill in the art will recognize that the present system and methods may find application in a variety of systems and the illustrated embodiments should be regarded as exemplary only and should not be deemed to be limiting in scope.

Some portions of the description that follow are presented in terms of algorithms and symbolic representations of operations on data within a computer memory (e.g., in flow chart format). These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In accordance with one embodiment of the present invention, a collection of one or multiple "Web routers" is used to refer a request for an object to a Web cache or content server (or other information object repository) that is able to transfer the requested object to the target client while satisfying a given set of performance metrics. Note, this referral may be made without regard as to whether the designated information object repository actually includes the requested information object(s). As used herein, the term Web router is used to refer to an embodiment (which may be implemented in hardware and/or software to be executed by a computer system) of a computer system configured in accordance with the methods (described below) needed to map the address of a client with the address of a Web cache that can deliver requested information objects optimally to the client. The performance metrics used by Web routers to choose the sites (Web cache or content server) that should provide the requested objects to the clients can include network delays, available bandwidth, reliability of paths from the chosen sites to the target clients, and loads on the Web caches and content servers. The method used to select the best site from which information objects should be retrieved is transparent to the clients, and the computer network or internetwork over which the system operates need not support multicast delivery to end-user sites.

A Web router may be co-located with a Web server, a Web cache, a hosting server, a DNS server or an original content server. A topology of Web routers is defined such that a given Web router has as its neighbor Web routers a subset of all the Web routers in the system. A Web router communicates directly with its neighbor Web routers, and, preferably, not with other Web routers.

In one embodiment of the present invention, a Web router is contacted according to a scheme for enabling the discovery of the caches and servers storing information objects distributed over computer networks, which can be implemented in hardware and/or software, by a client, a Web server, a Web cache, or another type of server with a request for the address of one or more Web caches that a client should contact to obtain an information object. Further descriptions of these various schemes are presented below. A complete description of a Web router is included in co-pending U.S. patent application Ser. No. 09/810,148, entitled "System and Method for Discovering Information Objects and Information Object Repositories in Computer Networks", filed Mar. 15, 2001.

By utilizing the Web router concept, the present invention approaches the challenge of providing an efficient, scalable, server-directed Web content delivery system from a network layer perspective. Further, the present invention provides efficiency and scalability at least as good as that of the underlying infrastructure technologies. In one embodiment, the present invention includes routing technologies that may be used to leverage the underlying network routing to provide optimal selection of cache sites and content distribution paths, for example through the use of transport-layer protocols which may be used to make the most efficient use of network resources for content delivery. These protocols may also include signaling and congestion avoidance mechanisms which may be used to further optimize the use of network resources to levels of effectiveness and efficiency beyond that typically provided by underlying infrastructure services.

Figure 1:
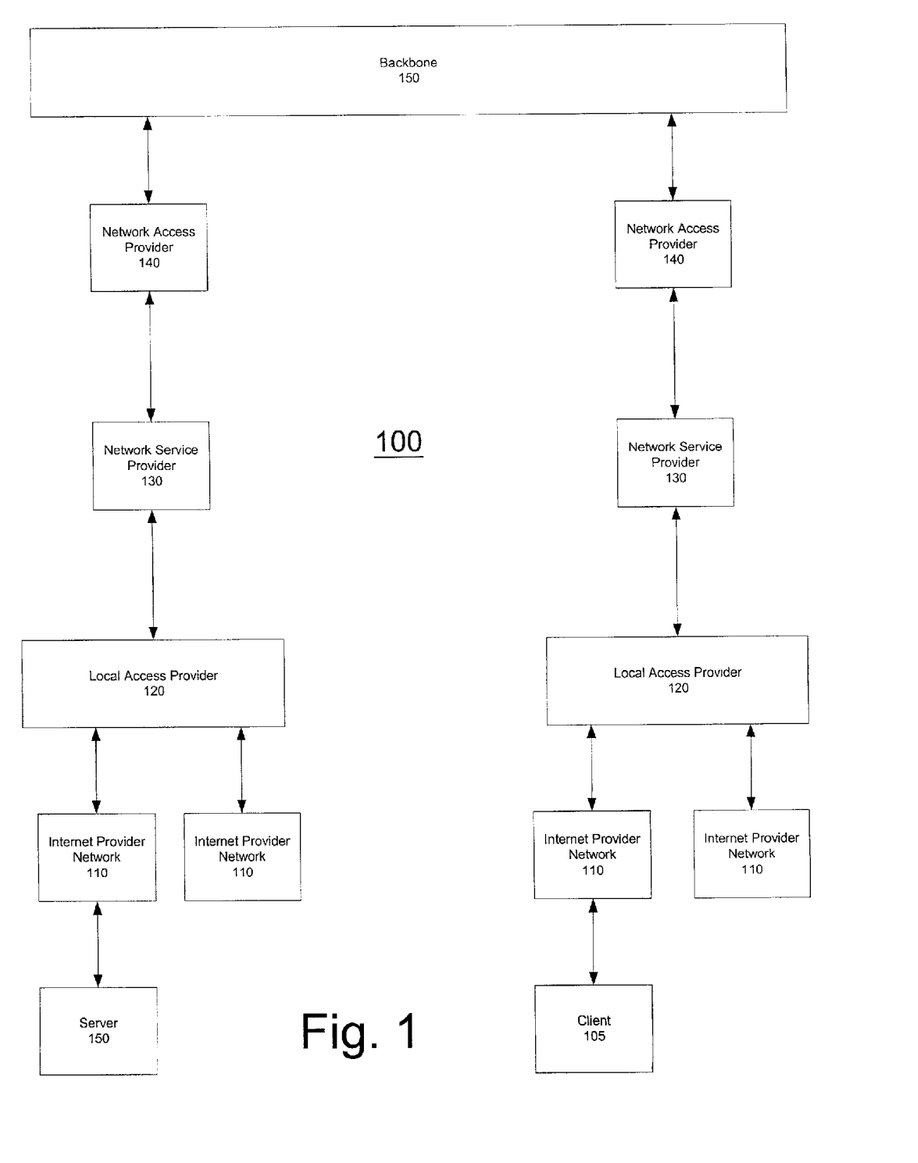
FIG. 1 illustrates a conventional internetwork, such as the Internet.

FIG. 1 illustrates an internetwork 100. The methods and systems described herein, which can be implemented in software and/or hardware, enable the discovery of either information objects or the caches and servers storing information objects distributed over computer networks such as the internetwork 100 shown in this illustration. One example of an internetwork 100 is the Internet. Other examples include enterprise networks, local area networks, wide area networks, metropolitan area networks and networks of such networks. In the case where internetwork 100 is the Internet, clients 105 will generally access content located at remote servers 150 through a series of networks operated by different providers. For example, clients 105 may have accounts with local Internet service providers (ISPs) 110 that enable the clients to connect to the Internet using conventional dial-up or one of a variety of high-speed connections (e.g., DSL connections, cable connections, hybrids involving satellite and dial-up connections, etc.). ISPs 110, in turn, may provide direct connections to the Internet or, as shown, may rely on other service providers 120, 130, 140, to provide connections through to a set of high-speed connections between computer resources known as a backbone 150. Connecting to a host (e.g., server 150) may thus involve connecting through networks operated by a variety of service providers.

Overview of Minimizing Latency on Cache Hits

In one embodiment, one component of the present invention involves minimizing the latency of cache hits. Concretely this translates into minimizing the topological distance between the Web client and the cache server. In an exemplary embodiment, two mechanisms are defined in the architecture of the present invention for this purpose:

(1) one mechanism for use in initially establishing the Web client to cache server connection; and (2) the other mechanism for use in providing continuous adjustment of this connection in response to changing network conditions.

As explained above, optimal cache selection is achieved through the use of Web routers. In an exemplary embodiment, the present invention attempts to allow the Web client to begin downloading content from a cache server offering the lowest latency.

Figure 2:
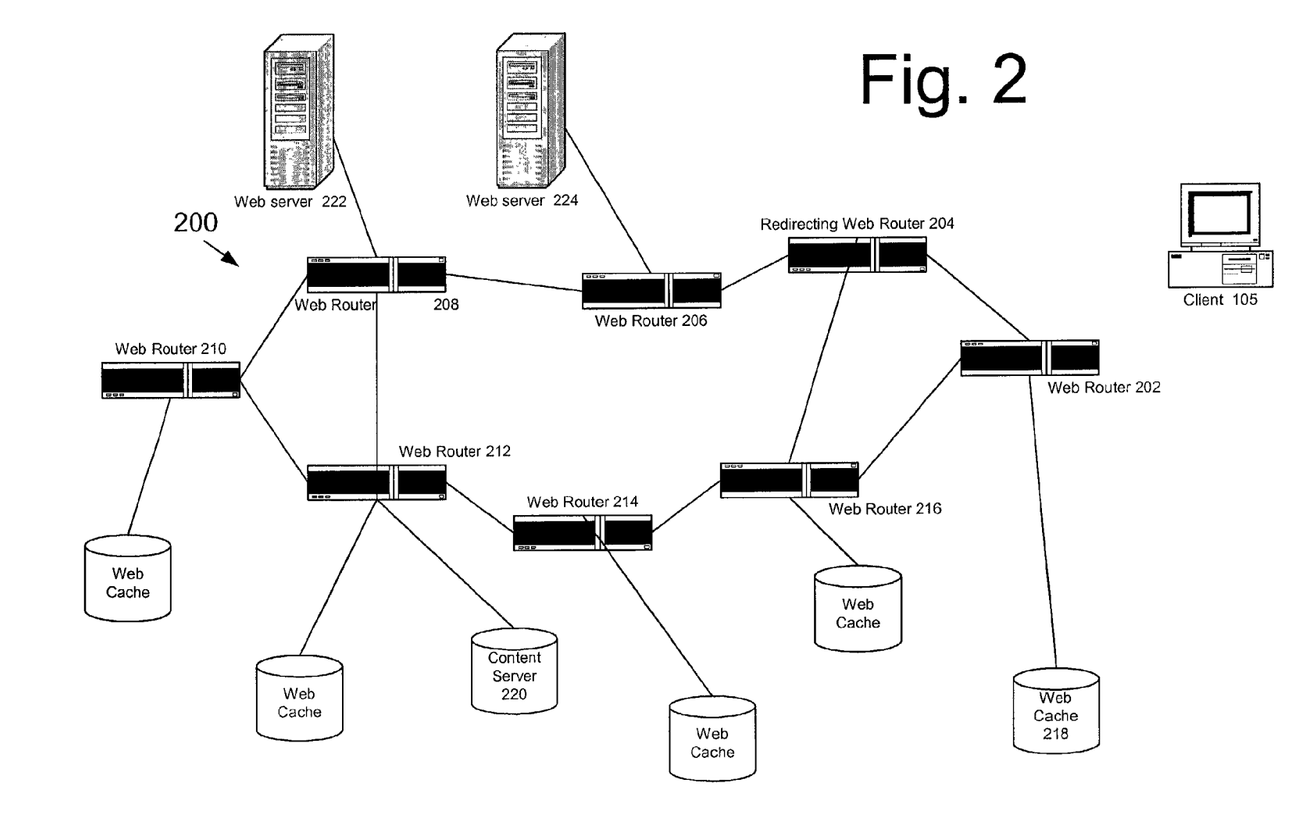
FIG. 2 illustrates a network having a virtual topology of Web routers configured in accordance with an embodiment of the present invention.

FIG. 2 illustrates a virtual network 200 of Web routers 202-216 defined on top of the physical topology of an internetwork, such as the Internet, consisting of routers interconnected via point-to-point links or networks. The virtual network 200 of Web routers includes point-to-point links configured between the Web routers 202-216, and the links configured between a Web router (e.g., Web router 202) and one or more Web caches (e.g., Web cache 218) and content servers (e.g., content server 220). Such links can be implemented using tunnels between Web routers and between Web routers and Web caches. As used herein, the term content server is meant to indicate a server that serves as the origination point for a piece of content (e.g., text, video, audio, etc.). Such content may subsequently be replicated at one or more Web caches. As shown in the figure, a client 105 is not necessarily part of the virtual network of Web routers.

As indicated above, a Web router is one embodiment of the methods described herein for discovering information objects and object repositories in computer networks. The functionality of a Web router can be implemented as part of a Web cache, as part of a router, or as a separate entity. To simplify its description, the Web router is described and treated herein as a separate entity from a Web cache or a router.

A Web router may be co-located with a Web server, a Web cache, or an original content server. In one embodiment of the present invention, a Web router may be implemented in software to be executed by a general-purpose (or special purpose) computer processor, or it may be implemented as part of the software of a router or Web cache. In another embodiment of the present invention, some or all of the Web router functionality may be implemented in hardware.

In a preferred embodiment of the present invention, a collection of one or multiple Web routers is used to refer the request for an object to a Web cache or the content server that is able to transfer the requested object to the target client while satisfying a given set of performance metrics. The performance metrics used by Web routers to pick the sites (Web cache or content server) that should provide the requested objects to the clients are called type-of-service (TOS) parameters and include, but are not limited to, network delays, bandwidth available, reliability of paths from the chosen sites to the target clients, and loads on the Web caches and content servers. The value of the TOS parameters of the path from a server or Web cache to a client is called the TOS distance of such a server or Web cache to the client. The technique used to select the best site from which information objects should be retrieved by user sites (clients) is transparent to the user sites, and the computer network or internetwork over which the system operates need not support multicast delivery to end-user sites.

To reduce communication and processing overhead in Web routers, a topology of Web routers is defined, such that a given Web router has as its neighbor Web routers a subset of all the Web routers in the system (where the term system refers to all or a portion of the virtual network for Web routers discussed above). A Web router may thus be configured with its set of neighbor Web routers. Such a configuration may be a table of neighbor Web routers which is defined by a network service provider and/or is dynamically updated. In another embodiment of the present invention, a Web router dynamically selects the set of neighbor Web routers with which it should communicate out of all of the Web routers in the system. A Web router preferably communicates with its neighbor Web routers only and uses the Web Information Locator by Distance (WILD) protocol for this purpose. The WILD protocol is disclosed in co-pending and commonly-owned U.S. Provisional Application No. 60/200,401, filed Apr. 28, 2000, from which U.S. patent application Ser. No. 09/810,148, filed Mar. 15, 2001 (now U.S. Pat. No. 7,162,539 B2, issued Jan. 9, 2007) claims priority.

In one embodiment of the present invention, WILD runs on top of the Transmission Control Protocol (TCP) in much the same way as the Border Gateway Protocol (BGP) does. In this embodiment, a TCP connection exists between a Web router and each of its neighbor Web routers. In another embodiment of the present invention, WILD can run on top of the TCP Santa Cruz protocol [C. Parsa and J. J. Garcia-Luna-Aceves, "TCP-Santa Cruz: Improving TCP Performance over Networks with Heterogeneous Transmission Media", Proc IEEE ICNP 99], which is disclosed in commonly-owned U.S. Provisional Application No. 60/190,331, filed on Mar. 16, 2000, from which U.S. patent application Ser. No. 09/810,148, filed Mar. 15, 2001 (now U.S. Pat. No. 7,162,539 B2, issued Jan. 9, 2007) claims priority. Other embodiments of the present invention may be based on alternative protocols for the provision of reliable transmissions between Web routers.

In one example of the operation of a system which employs an embodiment of the present invention, a client first contacts a Web server requesting a Web page in which a set of information objects are referenced by their URLs. In turn, the Web server may contact a Web router to determine the sites (e.g., one or more Web cache(s) or an original content server, any of which may be referred to generically as an information object repository) from which each of such information objects should be retrieved. Depending on the implementation, a Web router can be contacted by a client, a Web cache, a content server, or another type of server (e.g., Web server 222 or 224), asking for the address of a Web cache, set of Web caches, or content server that a client should contact for the purposes of retrieving information objects. In the present example, the Web server provides the Web router with the address of the client requesting the set of object, a URL for each information object requested by the client, and a set of TOS parameter values with which the request should be serviced to the client. The absence of TOS parameters can be assumed to imply a minimum-delay service request.

Those Web routers that are used to redirect clients to appropriate Web caches or content servers are implemented in a very fault-tolerant manner and are well known throughput the system. Accordingly, in one embodiment, not all Web routers in a system are used for client redirection in order to reduce the cost of Web routers and the communication overhead associated with knowing about the existence of Web routers that are capable of redirecting clients to Web caches and content servers. Thus, a network may include a set of redirecting Web routers.

The set of redirecting Web routers should be known by all the Web routers of the system, while a Web router that does not serve as a redirecting Web router need not be known by all other Web routers of the system. Web routers may execute WILD (or another protocol) to map the address of a client into: (a) one or more addresses of Web caches or the content server that has the best TOS distance to the client address, and (b) one or more addresses of redirecting Web routers that have the best TOS distance to the client address. In some cases, this mapping is done independently or regardless of whether the Web cache or content server maintains a local copy of any of the information objects required by the client (the idea being that the content can be brought to the cache after the client has been advised of the "best" or "preferred" cache to connect to).

As indicated, Web routers may use WILD or a non-WILD protocol to accomplish the above mappings. For example, in one embodiment, Web routers may use a static, fixed mapping of the address of a client into: (a) one or more addresses of Web caches or the content server that has the best TOS distance to the client address, and (b) one or more addresses of redirecting Web routers that have the best TOS distance to the client address. Such static, fixed mappings may be input by a user or a network service provider and may or may not be updated periodically. The static, fixed mappings may be generated by WILD or by an algorithm other than WILD. In either case, the static, fixed mappings may be generated independently of whether the Web cache or content server maintains a local copy of any of the information objects required by the client.

In one embodiment of the present invention, the Internet routers of the system provide Web routers with distances to known destination addresses measured according to a number of network performance parameters. A Web router collocated with a Web cache or content server uses the information obtained from adjacent routers and the performance measurements of the Web cache or content server to derive the TOS distance from the collocated Web cache or content server to each known destination, which corresponds to potential client addresses. In one embodiment, Web routers use routing information provided by the Border Gateway Protocol (BGP) and any of the intra-domain routing protocols (e.g., OSPF, EIGRP) running in the routers attached to the same local area networks where the Web routers reside to derive distances to client address ranges (e.g., using a shortest-path first calculation).

Regardless of how the actual mapping is done (e.g., whether using WILD or another algorithm), if a Web router maps the address of the client requiring the location of information objects to addresses of Web caches or other information object repositories that do not currently store such objects, the Web router can request the corresponding Web caches to obtain a copy of the required objects immediately after it provides the requesting Web server the address of such a Web cache or proxy. In another embodiment, a Web cache or proxy attempts to retrieve a requested object from another Web cache or a content server only after it is contacted by a client and determines that a copy of the requested information object is not available locally. In both instances, the Web router provides the Web cache servicing a client request with the address of the "nearest" Web cache that stores the information object requested by the client; therefore, the Web cache needing the information object communicates directly with the Web cache storing the requested information object, without having to go through any intermediate Web caches and without having to know the content stored in all other Web caches as is customary in the prior art.

Building on the above then, the Web router is responsible for determining which of a number of available information object repositories should service a client (i.e., a client or a Web server request for an information object or service). The Web router also determines the information object repository which actually maintains the information object or service so requested, and initiates the process of bringing the information object or service to the information object repository that should service the client. Bringing the information object or service requested by the client to the information object repository which it has been determined should service the client request is accomplished, in one embodiment, by instructing that information object repository which will service the request to retrieve the information object or service requested by the client from the information object repository which actually maintains the information object or service. Thereafter, upon receiving an instruction to do so, the information object repository which it has been determined should service the client request contacts the information object repository that actually maintains the information object or service requested by the client directly to request the information object or service.

In a further embodiment, one of the following four mechanisms, or, a combination of some of the following four mechanisms, is or may be used to communicate the best Web cache or content server, or the set of Web caches (more generally the information object repository(ies)), which should serve a client's request:

(1) direct cache selection;
(2) redirect cache selection;
(3) remote DNS cache selection; and
(4) client DNS cache selection.

These approaches are described in detail in co-pending U.S. Provisional Patent Application No. 60/200,404, entitled "System and Method for Using a Mapping Between Client Addresses and Addresses of Caches to Support Content Delivery", filed Apr. 28, 2000, and U.S. patent application Ser. No. 09/843,789, entitled "System and Method for Using a Mapping Between Client Addresses and Addresses of Caches to Support Content Delivery", filed Apr. 26, 2001.

Dynamic Congestion Adaptation During Content Download

In some cases, after the initial client-server connection is established, and a download is in progress, continuous monitoring and adjustment of the connection is performed to adjust to changing network conditions. This may be especially important for larger content (i.e., large files), such as streaming media, which may require an extended period to download. During such long downloads, network conditions may change sufficiently such that the path from the initial cache server to the client degrades to an unacceptable state. To avoid this situation, in one embodiment, the cache servers constantly (or periodically) monitor and adjust existing connections. In the event performance on an existing connection appreciably degrades, the cache servers may begin a process of searching for other cache servers with significantly better paths to the client. If such a server is found the download is transferred to the new cache, and the process is repeated. Another embodiment may include a dynamic redirector selection at the Web server.

Overview of Minimizing Latency on Cache Misses

In one embodiment, another component of the present invention includes a set of technologies that minimize the latency of cache misses. Thus, on a cache miss the selected cache server locates the closest cache server with a copy of the desired content and downloads the content from that server as fast and efficiently as possible. As explained above, this may be performed in parallel with the requesting client being informed of the IP address of the cache server which is obtaining the content.

Network-Layer URL Routing

Figure 3:
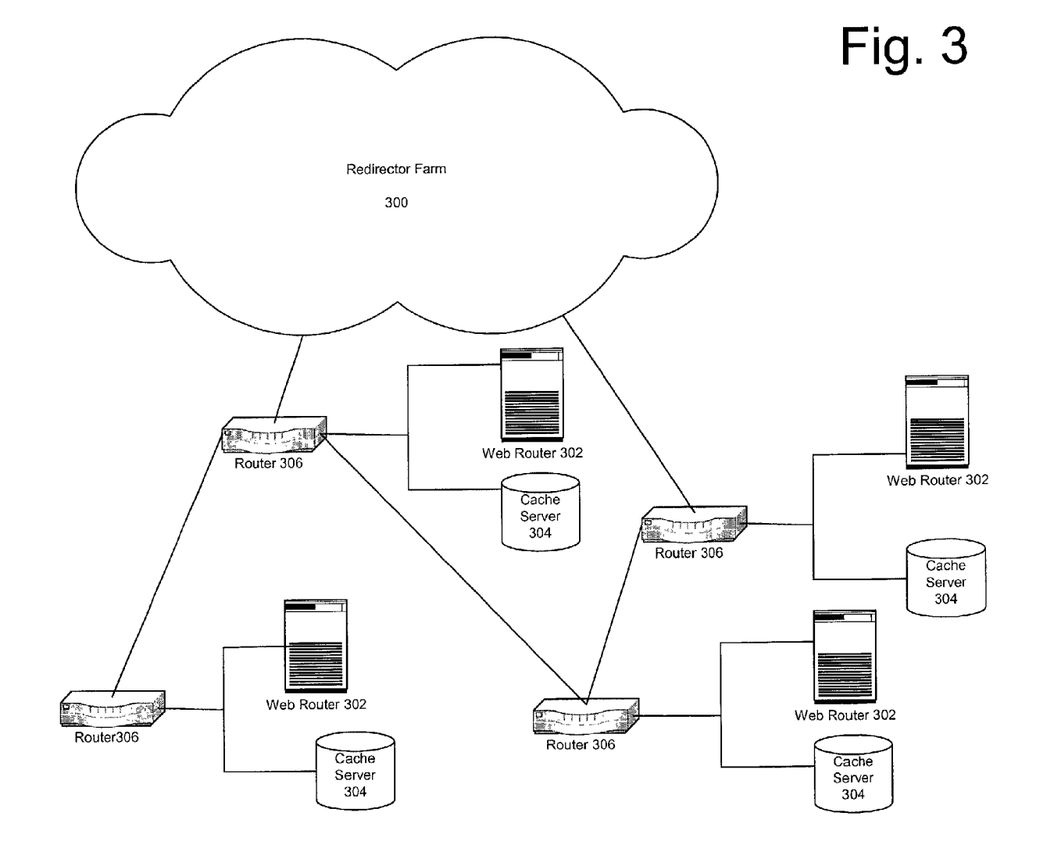
FIG. 3 illustrates one example of the interconnection of Web routers and cache servers with each other and a farm of redirectors using conventional IP routers in accordance with one embodiment of the present invention.

In one embodiment, as illustrated in FIG. 3, the present invention includes pairs of Web routers 302 and cache servers 304 interconnected with each other and a farm of redirectors 300 by conventional IP routers 306. In such cases, this component of the present invention exploits the IP routing infrastructure to provide, in effect, routing of URLs.

In one embodiment, network-layer URL (NURL) routing involves mapping requested URLs to unicast addresses which are then used as an anycast IP address (i.e. a unicast address advertised by multiple, physically distinct points in an internet) [Craig Partridge, Trevor Mendez, and Walter Milliken. Host anycasting service. RFC 1546, November 1993]. A system and method for using uniform resource locators (URLs) to map application layer content names to network layer anycast addresses, the aforementioned mapping, is disclosed in co-pending and commonly-owned U.S. Provisional Application No. 60/200,511, filed Apr. 28, 2000, which is incorporated herein by reference.

In one example, in order to facilitate this mapping, content served by the present invention are assigned URLs having the following format:

http://<Redirector IP>/<URL Anycast IP>/<URL Multicast IP>.

A system and method for using network layer URL routing to locate the closest server carrying specific content (network-level routing of URLs) is disclosed in co-pending and commonly-owned U.S. Provisional Application No. 60/200,402, filed Apr. 28, 2000, which is incorporated herein by reference.

With the route to the anycast cache server existing in the network infrastructure, a cache server processing a cache miss would like to transfer the content from the URL IP address. In an exemplary embodiment, in such a situation, the present invention resolves the anycast address to the server's real unicast address (which, by definition, uniquely identifies that server in the internet) before starting the download. In an exemplary embodiment, this is done by using an anycast address resolution protocol (AARP), which is disclosed in co-pending and commonly-owned U.S. Provisional Application No. 60/200,403, filed Apr. 28, 2000, which is incorporated herein by reference.

Anycast Address Resolution Protocol

In Internet Protocol Version 6 (IPv6), anycast is communication between a single sender and the nearest of several receivers in a group. The term exists in contradistinction to multicast, communication between a single sender and multiple receivers, and unicast, communication between a single sender and a single receiver in a network. Anycasting is designed to let one host initiate the efficient updating of router tables for a group of hosts. IPv6 can determine which gateway host is closest and sends the packets to that host as though it were a unicast communication. In turn, that host can anycast to another host in the group until all routing tables are updated.

With a route to an anycast cache server existing in the network infrastructure, a cache server processing a cache miss would like to transfer information object(s) (i.e., content) based on the URL IP address. The problem with using this anycast IP address is that, since it may be advertised from multiple servers in the Internet, the underlying routing for such an address could change mid-download, causing the connection to go to a different server. Because these downloads are typically done using a stateful protocol such as TCP [Jon Postel. Transmission control protocol. RFC793, September 1981], such a mid-stream change in destinations would cause the connection to fail. In one embodiment, the present invention resolves any anycast address to the information object repository's real unicast address (which, by definition, uniquely identifies that information object repository in the Internet) before starting the download. This is done using an anycast address resolution protocol (AARP).

Stated differently, the present invention allows information object repositories (or other network nodes) to resolve the virtual address of identified content (e.g., stored at a cache server) to obtain the actual address of the content. The content at the actual address may then be sent to the client (or other information object requester) that had requested it. In an exemplary embodiment, an anycast IP address is resolved to a unicast address that can be used to actually download desired content.

Figure 4:
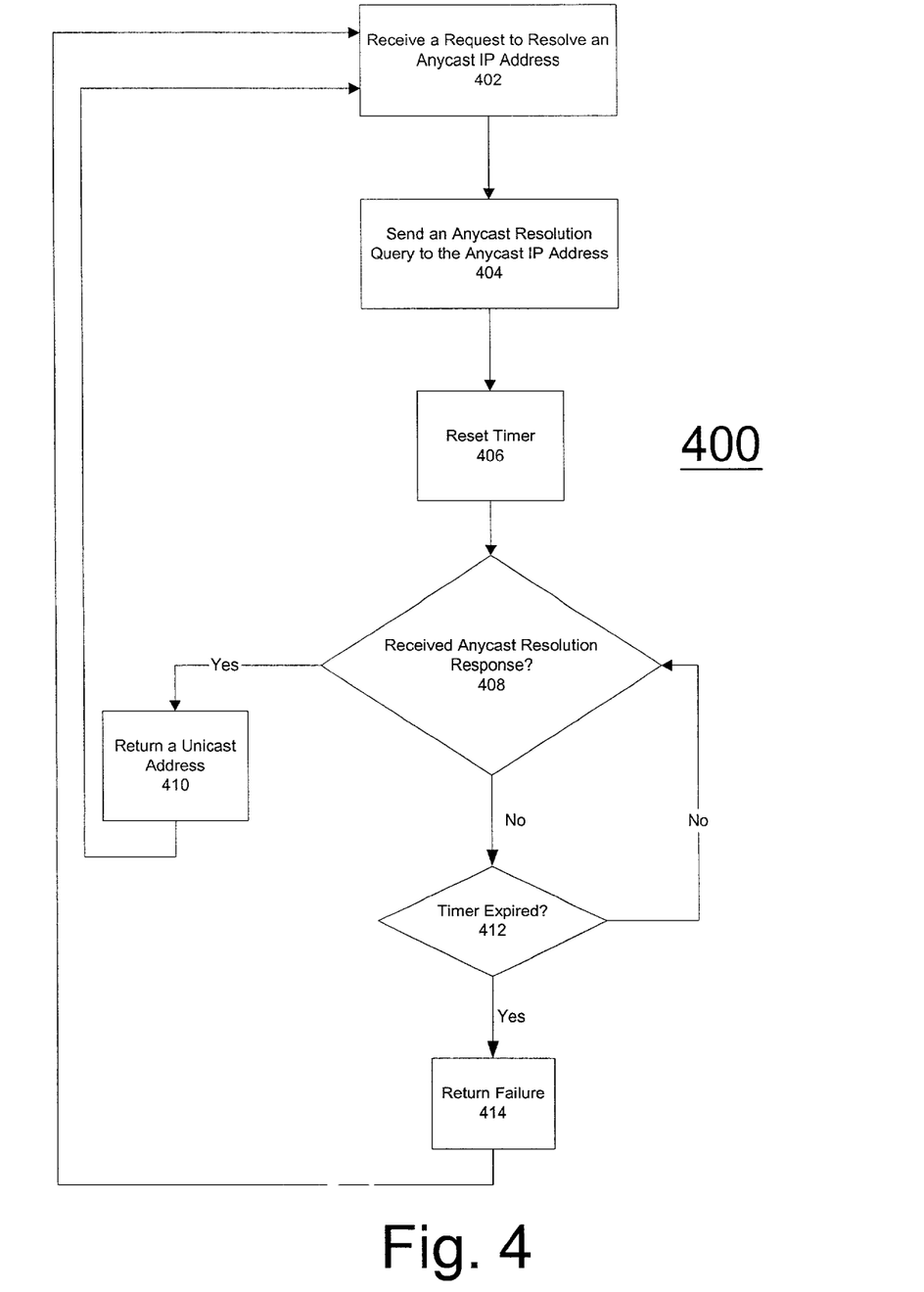
FIG. 4 is a flowchart illustrating one embodiment of a method of operating a cache server in accordance with an embodiment of the present invention.

FIG. 4 is a flowchart of a method 400 of operating an AARP cache server according to one embodiment of the present invention. In step 402, the AARP cache server receives a request to resolve an anycast IP address. The request may come from a client, a Web server, a Web router, another cache server, or any other network component. In the response to this request, in step 404, the AARP cache server sends an anycast resolution query to the anycast IP address. In step 406, a timer is reset. This is an optional step, but is recommended to avoid any undue delays in the resolution process.

In decision operation 408, it is determined whether the AARP cache server has received an anycast resolution response. If the AARP cache server has received an anycast resolution response, in step 410, the AARP cache server returns a unicast address. If the AARP cache server has not received an anycast resolution response, in decision operation 412, it is determined whether the timer has expired. This loop repeats until either the anycast resolution response is returned or the timer expires. If the timer expires, in step 414, the AARP cache server returns a failure, and, the process resets. Note, although this procedure is described with reference to a cache server, it can in fact be performed at any appropriately configured network node.

Figure 5:
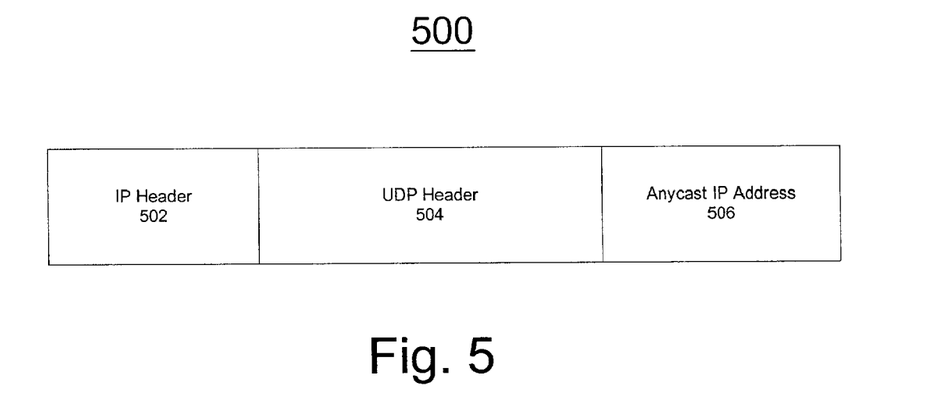
FIG. 5 illustrates an anycast resolution query in accordance with an embodiment of the present invention.

As part of AARP, FIG. 5 illustrates an anycast resolution query 500 according to one embodiment of the present invention. The anycast resolution query 500 includes an IP header 502, a UDP header 504, and an anycast IP address 506. In an exemplary embodiment, an important characteristic of an AARP query 500 is that it is guaranteed to fit in a single IP packet. This request is transmitted to the anycast IP address and seeks in return, the unicast address of the host at the anycast address.

Figure 6:
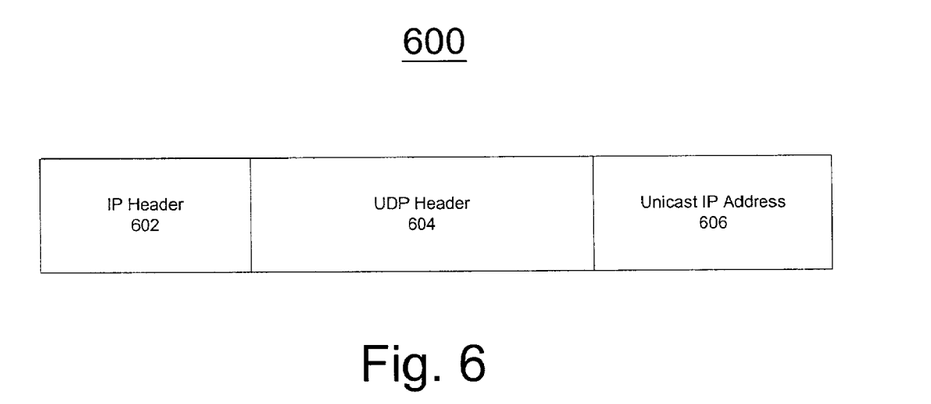
FIG. 6 illustrates an anycast resolution response in accordance with an embodiment of the present invention

As another part of AARP, FIG. 6 illustrates an anycast resolution response 600 according to one embodiment of the present invention. The anycast resolution response 600 includes an IP header 603, a UDP header 604, and an unicast IP address 606. In an exemplary embodiment, an important characteristic of an AARP response 600 is that it is guaranteed to fit in a single IP packet. This response is made by the host at the unicast address, or by any other network node that has a mapping of the anycast to unicast address. Such mappings may be simple lookup tables which are statically or dynamically updated.

CONCLUSION

The present invention provides a system and method for resolving network layer anycast addresses into network layer unicast addresses. In one embodiment, the present invention is part of a method and system for the discovery of information objects and servers storing information objects distributed over computer networks. Having fully described various preferred embodiments of the invention and various alternatives thereto, it should be recognized that numerous alternatives and equivalents exist which do not depart from the invention. Accordingly, the invention should only be measured in terms of the claims, which follow.

What is claimed is:

1. A method, comprising:
receiving a first request for an information object at an anycast address of a network, wherein the request is received at an information object repository selected according to specified performance metrics by executing a Web Information Locator by Distance (WILD) communication protocol that runs on top of a Transmission Control Protocol (TCP) to map an address of a client to one or more addresses of Web caches or a content server that has a best type-of-service distance to the address of the client and to one or more addresses of redirecting Web routers that have the best type-of-service distance to the address of the client wherein the WILD protocol comprises a WILD update message for communicating mappings of client address ranges to neighboring Web routers, wherein the WILD update message comprises a basic routing update, a list of type-of-service distances from the Web caches to destinations, and a list of type-of-service distances from the redirecting Web routers to the destinations;

resolving the anycast address to a corresponding unicast network address for the information object, wherein the resolving includes transmitting a second request for the corresponding unicast network address in response to the first request, awaiting an anycast resolution response to the second request for a predetermined time, and returning a failure message if the response to the second request is not received within the predetermined time, wherein the second request is a single Internet Protocol (IP) packet having the anycast network address;

instructing the information object repository to obtain a copy of the information object at the corresponding unicast network address; and returning the corresponding unicast network address, if the anycast resolution response in response to the second request is received within the predetermined time, the anycast resolution response is a single IP packet having the corresponding unicast network address.

2. The method of claim 1 further comprising returning the unicast network address for the information object.

3. The method of claim 1 wherein the performance metrics comprise one or more of: reliability of a path from the selected information object repository, available bandwidth in said path, average delay from the selected information object repository to a source of the request, average processing delay at the selected information object repository, and loads on the selected information object repository.

4. An information object repository comprising a Web router configured to resolve a network layer anycast address of a network to a network layer unicast address in response to a first request for an information object at the network layer anycast address, wherein resolving the network layer anycast address includes transmitting a second request to the anycast address in response to the first request, to obtain a copy of the information object at the network layer unicast address, and to receive an anycast resolution response in response to the second request to resolve the network layer anycast address, wherein the information object repository is selected according to specified performance metrics by the Web router executing a Web Information Locator by Distance (WILD) communication protocol to communicate with neighboring Web routers that runs on top of a Transmission Control Protocol (TCP) to map an address of a client to one or more addresses of Web caches or a content server that has a best type-of-service distance to the address of the client and to one or more addresses of redirecting Web routers that have the best type-of-service distance to the address of the client, wherein the Web router comprises storage means for storing a WILD update message for communicating mappings of client address ranges to the neighboring routers, wherein the WILD update message comprises a basic routing update, a list of type-of-service distances from the Web caches to destinations, and a list of type-of-service distances from the redirecting Web routers to the destinations, wherein the second request to resolve is a single Internet Protocol (IP) packet that includes the network layer anycast address, wherein the anycast resolution response is a single Internet Protocol (IP) packet that includes the network layer unicast address.

5. The information object repository of claim 4 being further configured to resolve the network layer anycast address by transmitting the second request for the network layer unicast address and awaiting the response thereto.

6. The information object repository of claim 5 being further configured to return a failure message to a source of the request for the information object if the response to the request for the network layer unicast address is not received within a timeout period.

7. A network, comprising:

at least one client configured to transmit a first request for an information object using a network layer anycast address;

an information object repository configured to receive the request for the information object, to resolve the network layer anycast address into a network layer unicast address that includes transmitting a second request to the network layer anycast address for the network layer unicast address in response to the first request, to obtain a copy of the information object at the network layer unicast address, and to receive an anycast resolution response in response to the second request to resolve the network layer anycast address; and a Web router, wherein the information object repository is selected according to specified performance metrics by the Web router executing a Web Information Locator by Distance (WILD) communication protocol to communicate with neighboring Web routers that runs on top of a Transmission Control Protocol (TCP) to map an address of a client to one or more addresses of Web caches or a content server that has a best type-of-service distance to the address of the client and to one or more addresses of redirecting Web routers that have the best type-of-service distance to the address of the client, wherein the Web router comprises storage means for storing a WILD update message for communicating mappings of client address ranges to the neighboring routers, wherein the WILD update message comprises a basic routing update, a list of type-of-service distances from the Web caches to destinations, and a list of type-of-service distances from the redirecting Web routers to the destinations, wherein the second request is a single IP packet that includes the network layer anycast address, wherein the anycast resolution response is a single IP packet that includes the network layer unicast address.

8. The network of claim 7 wherein the information object repository is further configured to resolve the network layer anycast address by transmitting the second request for the network layer unicast address and awaiting the anycast resolution response thereto.

9. The network of claim 8 wherein the information object repository is further configured to return a failure message to the client if the anycast resolution response to the second request for the network layer unicast address is not received within a timeout period.

10. The network of claim 8 wherein the anycast resolution response to the second request for the network layer unicast address is returned by a host having the network layer unicast address.

11. The method of claim 1 wherein the first request is received at the information object repository selected without regard as to whether the information object is actually stored at the information object repository.

12. The network of claim 7 wherein the single IP packet comprising the second request for the network layer unicast address and the single IP packet comprising the anycast resolution response to the second request for the network layer unicast address further comprise an IP header and a UDP header.

* * * * *